(12) United States Patent
Li

(10) Patent No.: US 8,130,317 B2
(45) Date of Patent: Mar. 6, 2012

(54) METHOD AND SYSTEM FOR PERFORMING INTERLEAVED TO PLANAR TRANSFORMATION OPERATIONS IN A MOBILE TERMINAL HAVING A VIDEO DISPLAY

(75) Inventor: Weidong Li, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 1756 days.

(21) Appl. No.: 11/353,686

(22) Filed: Feb. 14, 2006

(65) Prior Publication Data

US 2007/0188514 A1  Aug. 16, 2007

(51) Int. Cl.
*H04N 7/01* (2006.01)
*H04N 11/20* (2006.01)

(52) U.S. Cl. ......... 348/453; 348/488; 348/716; 345/600

(58) Field of Classification Search ................ 348/453, 348/450, 441, 488, 577, 588, 506, 716–717, 348/663, 234–235, 714; 345/604, 600, 582, 345/503; 382/298, 165–167; *H04N 7/01, H04N 11/20*
See application file for complete search history.

(56) References Cited

U.S. PATENT DOCUMENTS 6,259,479 B1 *  7/2001  Gadre et al. ................. 348/441
6,326,984 B1 * 12/2001  Chow et al. .................. 715/764

(Continued)

*Primary Examiner* — Trang U Tran
(74) *Attorney, Agent, or Firm* — Sterne, Kessler, Goldstein, Fox PLLC

(57) ABSTRACT

Methods and systems for performing interleaved to planar transformation operations in a mobile terminal having a video display are disclosed. Aspects of one method may include extracting similar color space components from a received block of interleaved YUV color space format video data as data is received, where the block may comprise 128 bits. The similar color space components may be extracted and transferred to a memory, where each type of the similar color space components may be stored contiguously in separate portions of the memory in planar format. The transferring of data may be via direct memory access of 32-bit words. When the line buffer that is receiving the interleaved video data is full, a direct memory access operation may be initiated. Direct memory access operation may also be initiated when the data for a similar color space component for a complete horizontal line is extracted.

26 Claims, 11 Drawing Sheets

U.S. PATENT DOCUMENTS

| | | | |
|---|---|---|---|
| 6,674,479 B2 * | 1/2004 | Cook et al. | 348/453 |
| 6,961,063 B1 * | 11/2005 | Kuriakin et al. | 345/506 |
| 6,989,837 B2 * | 1/2006 | Gu et al. | 345/558 |
| 7,548,245 B2 * | 6/2009 | Evans et al. | 345/589 |
| 2008/0259102 A1 * | 10/2008 | Walmsley | 347/5 |
| 2010/0171762 A1 * | 7/2010 | MacInnis et al. | 345/660 |

* cited by examiner

FIG. 4a

| 410 | | | | | | | | | | | | | | | | |
|---|---|---|---|---|---|---|---|---|---|---|---|---|---|---|---|---|
| | Y 410a | U 410b | Y 410c | V 410d | Y 410e | U 410f | Y 410g | V 410h | Y 410i | U 410j | Y 410k | V 410l | Y 410m | U 410n | Y 410o | V 410p |

| 412 | | | | | | | | | | | | | | | | |
|---|---|---|---|---|---|---|---|---|---|---|---|---|---|---|---|---|
| | Y 412a | U 412b | Y 412c | V 412d | Y 412e | U 412f | Y 412g | V 412h | Y 412i | U 412j | Y 412k | V 412l | Y 412m | U 412n | Y 412o | V 412p |

400

| Y 410a | Y 410c | Y 410e | Y 410g | Y 410i | Y 410k | Y 410m | Y 410o | Y 412a | Y 412c | Y 412e | Y 412g | Y 412i | Y 412k | Y 412m | Y 412o |

420

| U 410b | U 410f | U 410j | U 410n | U 412b | U 412f | U 412j | U 412n |

422

| V 410d | V 410h | V 410l | V 410p | V 412d | V 412h | V 412l | V 412p |

METHOD AND SYSTEM FOR PERFORMING INTERLEAVED TO PLANAR TRANSFORMATION OPERATIONS IN A MOBILE TERMINAL HAVING A VIDEO DISPLAY

CROSS-REFERENCE TO RELATED APPLICATIONS/INCORPORATION BY REFERENCE

This application makes reference to:

U.S. application Ser. No. 11/353,900 filed on Feb. 14, 2006; and

U.S. application Ser. No. 11/354,704 filed on Feb. 14, 2006.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to video signal processing. More specifically, certain embodiments of the invention relate to a method and system for performing interleaved to planar transformation operations in a mobile terminal having a video display.

BACKGROUND OF THE INVENTION

When transmission of color TV signals were developed, a decision was made to have the broadcast equipment transmit one set of color signals that could be decoded by black and white TVs to show black and white images, and by color TVs to display color images. The resulting color encoding was called YUV format, and television broadcasters worldwide adopted this system. The signals in the YUV format are derived from the RGB format. The RGB color format is the format captured by the analog and digital cameras.

The Y channel in YUV is the "luma" or luminance channel, which carries brightness information, and is a sum of the R, G, and B color signals. The black and white TV sets decode only the Y part of the signal. The U and V channels in the YUV are the chroma channels of the YUV format, and carry the color information. Accordingly, the color TV sets will decode all three color components. The U channel carries blue minus luma (B-Y) information, and the V channel carries red minus luma (R-Y) information. Through a process called "color space conversion," the video camera converts the RGB data captured by its sensors into either composite analog signals (YUV) or component versions (analog YPbPr or digital YCbCr). For rendering on a TV screen, these color spaces must be converted back again to RGB by the TV or display system. Various standardized equations are used for converting RGB to YUV.

The original TV standard combined the luma (Y) channel and both chroma channels (U and V) into one channel, which is known as "composite video." An option known as "S-video" or "Y/C video" keeps the luma channel separate from the color channels, using one cable, but with separate wires internally. S-video provides a bit sharper images than composite video. When the luma channel and each of the color channels (B-Y and R-Y) are maintained separately, it is called "component video." Component video is designated as YPbPr when in the analog domain and YCbCr when in the digital domain. In practice, YUV refers to the color difference encoding format whether composite or component, and "YUV," "Y, B-Y, R-Y" and "YPbPr" are used interchangeably for analog signals. Sometimes, "YCbCr," which is digital, is used interchangeably as well.

The primary advantages of the YUV system are that it remains compatible with black and white analog television. Another advantage of YUV system is that some of the information may be discarded in order to reduce bandwidth. The human eye has fairly low color sensitivity. That is, the accuracy of the brightness information of the luminance channel has far more impact on the image discerned than information in the other two chrominance channels. Understanding this human shortcoming, standards such as NTSC reduce the amount of data consumed by the chrominance channels considerably, leaving the eye to extrapolate much of the color information. NTSC saves only 11% of the original blue information and 30% of the red information. The green information is usually preserved in the Y channel. Therefore, the resulting U and V channels can be substantially compressed.

Because the human eye is less sensitive to color than intensity, the chroma components of an image need not be as well defined as the luma component, so many video systems sample the chroma channels at a lower sampling frequency than for the luma channel. This reduces the overall bandwidth of the video signal without much apparent loss of picture quality. The missing values will be interpolated or repeated from the preceding sample for that channel.

The subsampling in a video system is usually expressed as a three part ratio. The three terms of the ratio are: the number of brightness ("luminance" "luma" or Y) samples, followed by the number of samples of the two color ("chroma") components: U/Cb then V/Cr, for each complete sample area. For quality comparison, only the ratio between those values is important, so 4:4:4 could easily be called 1:1:1. However, the value for brightness has been set to 4 traditionally, with the rest of the values scaled accordingly. There are other subsampling rates such as 4:2:2 and 4:2:0. Different video subsampling may be used due to different design specifications and/or implementations of different video standards. A problem may occur when a device receives video data with one subsampling rate while video data in that device is processed with another subsampling rate.

Because the human eye is less sensitive to color than intensity, the chroma components of an image need not be as well defined as the luma component, so many video systems sample the chroma channels at a lower sampling frequency than for the luma channel. This reduces the overall bandwidth of the video signal without much apparent loss of picture quality. The missing values will be interpolated or repeated from the preceding sample for that channel.

The subsampling in a video system is usually expressed as a three part ratio. The three terms of the ratio are: the number of brightness ("luminance" "luma" or Y) samples, followed by the number of samples of the two color ("chroma") components: U/Cb then V/Cr, for each complete sample area. For quality comparison, only the ratio between those values is important, so 4:4:4 could easily be called 1:1:1; however, traditionally the value for brightness is always 4, with the rest of the values scaled accordingly. There are other subsampling rates such as 4:2:2 and 4:2:0. Different video subsampling may be used due to different design specifications and/or implementations of different video standards.

Additionally, the video data generated from the output of the video image sensor may be in a YUV color space format and interleaved. However, when processing the video data, it may be more efficient to process the data in other video formats and this may sometimes require additional processing power, which may already be limited.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for performing interleaved to planar transformation operations in a mobile terminal having a video display, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4a is an exemplary diagram illustrating 2 horizontal lines of video with 4:2:2 video data format, which may be utilized in connection with an embodiment of the invention.

FIG. 4b is an exemplary diagram illustrating planar transformation of interleaved video data in YUV 4:2:2 color space format, in accordance with an embodiment of the invention.

DETAILED DESCRIPTION OF THE INVENTION

Certain embodiments of the invention may be found in a method and system for performing interleaved to planar transformation operations in a mobile terminal having a video display. Aspects of the method may comprise extracting similar color space components from a received block of interleaved YUV color space format video data as the video data is received. The received block of interleaved YUV color space format video data may comprise 128 bits. The similar color space components may be extracted and transferred to a memory, where each type of the similar components, namely Y, U, or V, may be stored contiguously in separate portions of the memory in planar format. The transferring of data may be via direct memory access of 32-bit words.

The block of interleaved YUV format video data may be received from a line buffer, which may be one of two line buffers. One of the two line buffers may receive the interleaved video data in YUV 4:2:2 color space format for a present horizontal line. The other line buffer may communicate the interleaved video data in YUV 4:2:2 color space format for a previous horizontal line for extraction of similar components. Each of the two line buffers, when receiving the interleaved video data in YUV 4:2:2 color space format, may receive the video data in byte format.

When the line buffer that is receiving the interleaved video data is full, a direct memory access transfer may be initiated. Direct memory access operation may also be initiated when the data for a similar component for a complete horizontal line is extracted. The similar component may be, for example, the similar Y component, the similar U component, or the similar V component of the YUV color space video data. Each of the similar Y component, the similar U component, and the similar V component of the YUV color space video data may comprise 8 bits of information per pixel.

Figure 1:
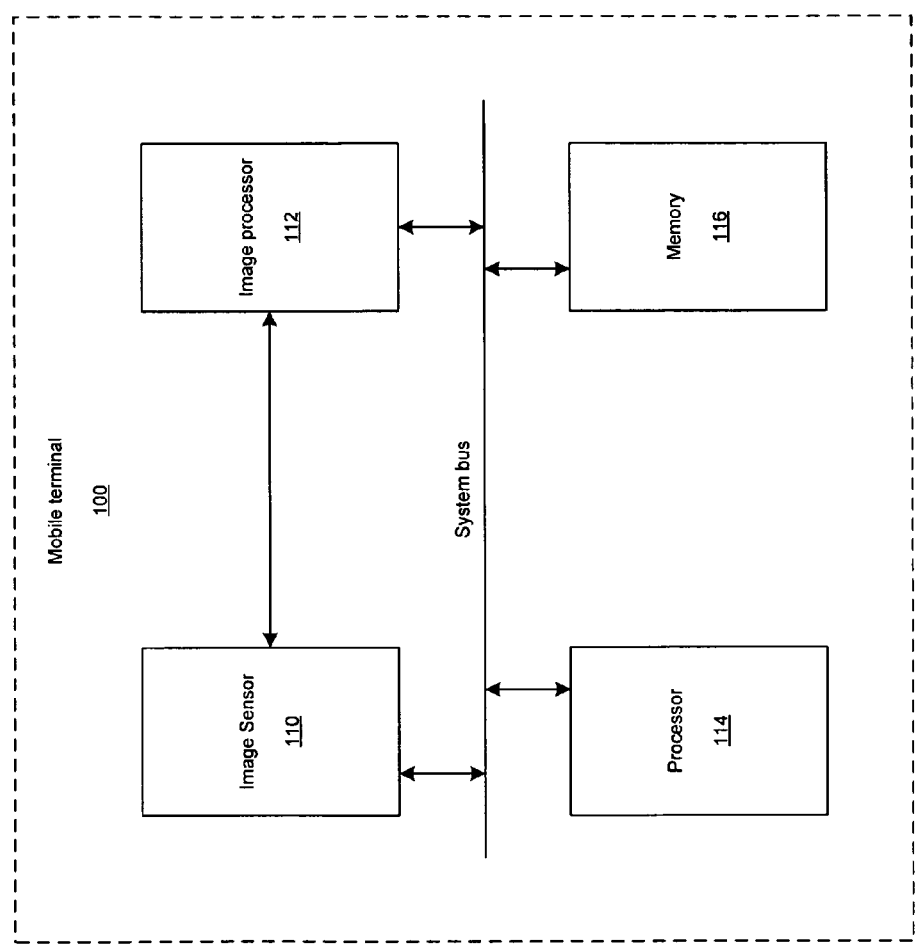
FIG. 1 is an exemplary diagram of a portion of a mobile terminal, which may be utilized in connection with an embodiment of the invention.

FIG. 1 is an exemplary diagram of a portion of a mobile terminal, which may be utilized in connection with an embodiment of the invention. Referring to FIG. 1, there is shown a mobile terminal 100. The mobile terminal 100 may comprise an image sensor 110, an image processor 112, a processor 114, and a memory block 116. The image sensor 110 may comprise suitable circuitry and/or logic that may enable capture of light intensity at a plurality of colors, such as, for example, red, green, and blue. The captured light intensity levels may be further processed as video and/or still photograph outputs. These color levels may be converted to the YUV color space format and the resulting color information may be communicated to, for example, the image processor 112 for further processing.

The image processor 112 may comprise suitable circuitry and/or logic that may enable processing of information in the Y, U, and V channels of the YUV color space. The information may be processed so that Y channel data may be transferred to one portion of, for example, the memory block 116, U data may be transferred to another portion of the memory block 116, and V channel data may be transferred to a third portion of the memory block 116. Accordingly, the luminance information in the Y channel, and the chrominance information in the U and V channels may be accessed and processed separately.

The processor 114 may determine the mode of operation of various portions of the mobile terminal 100. For example, the processor 114 may setup data registers in the image processor block 112 to allow direct memory access (DMA) transfers of video data to the memory block 116. The processor may also communicate instructions to the image sensor 110 to initiate capturing of images. The memory block 116 may be used to store image data that may be processed and communicated by the image processor 112. The memory block 116 may also be used for storing code and/or data that may be used by the processor 114. The memory block 116 may also be used to store data for other functionalities of the mobile terminal 100. For example, the memory block 114 may store data corresponding to voice communication.

In operation, the processor 114 may initiate image capture by the image sensor 110. The YUV color space data corresponding to the captured images may be communicated by the image sensor 110 to the image processor 112. The processor 114 may provide information to the image processor 112 for DMA transfer of processed video data to the memory block 116. The video data in the memory block 116 may be further processed by, for example, the processor 114. The operation of the image processor 112 is discussed in more detail with respect to FIG. 2.

Figure 2:
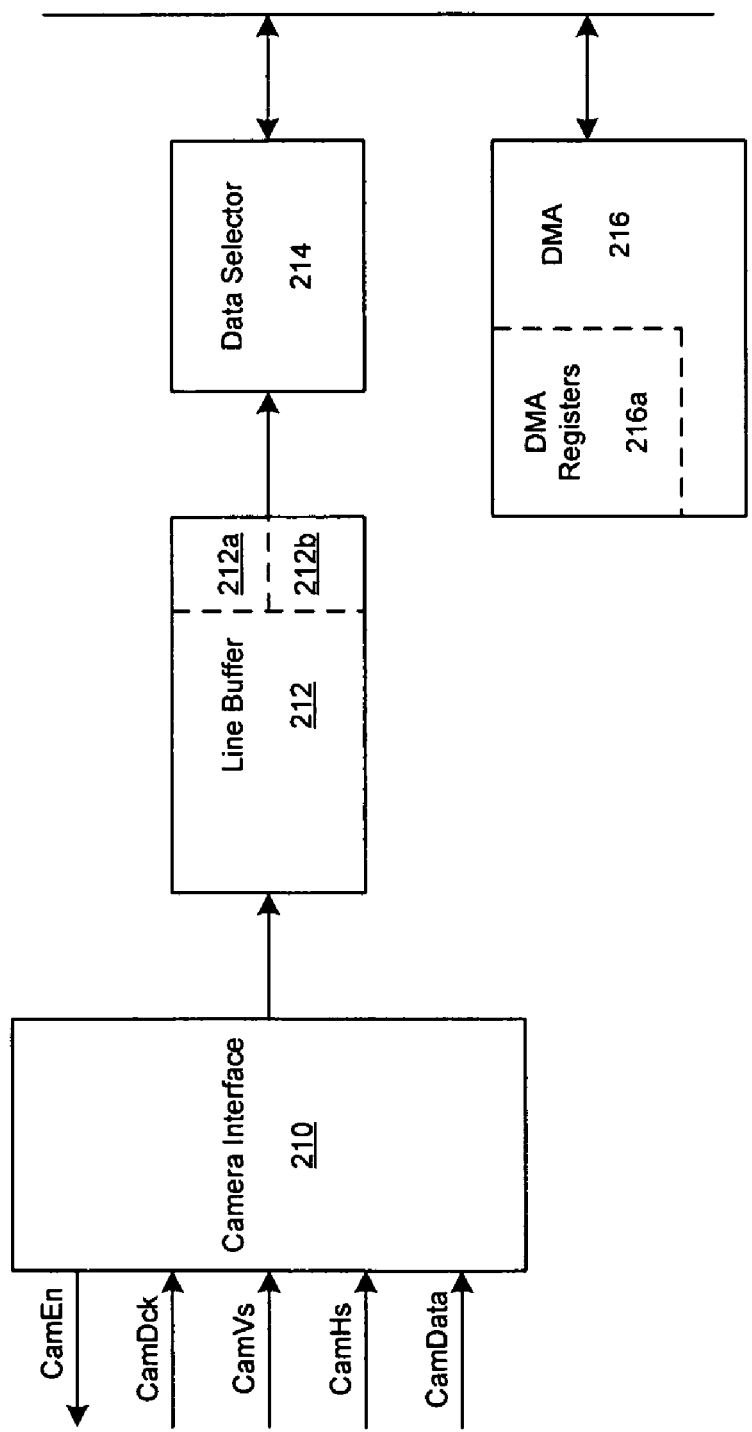
FIG. 2 is a block diagram illustrating an exemplary image processor, in accordance with an embodiment of the invention.

FIG. 2 is a block diagram illustrating an exemplary image processor, in accordance with an embodiment of the invention. Referring to FIG. 2, there is shown a camera interface block 210, a line buffer block 212, a data selector block 214, and a DMA block 216. The DMA block 216 may comprise a DMA register block 216a. The camera interface block 210 may comprise suitable circuitry, logic, and/or code that may enable reception of video data from the image sensor 110. The camera interface block 210 may communicate a camera enable signal CamEn to the image sensor 110. The image sensor 110 may communicate video data CamData, a video data synchronizing clock signal CamDck, a horizontal synchronization signal CamHs, and a vertical synchronization signal CamVs to the cameral interface block 210.

The line buffer block 212 may comprise suitable circuitry and/or logic that may enable storing of received image data from the image sensor 110. The line buffer block 212 may comprise, for example, two line buffers 212a and 212b. Video data for a present line may be received in, for example, the line buffer 212a while video data for a previous line stored in the line buffer 212b may be processed.

The data selector block 214 may comprise suitable circuitry and/or logic that may enable processing of data communicated by the line buffer block 212. The processing may comprise converting YUV 4:2:2 color space formatted data in the line buffer block to planar memory format. The processing may also comprise gathering data that corresponds to Y information to, for example, transfer to a contiguous portion of the memory block 116. Similarly, the processing may comprise gathering data that corresponds to U and V information so that the gathered information may be transferred to two other portions of the memory block. Accordingly, the Y, U, and V video information may be in separate portions of the memory block 116 and may be accessed separately for further processing.

The DMA block 216 may comprise suitable circuitry and/or logic that may enable transferring of data in the data selector block 214 to the memory block 116. A processor, for example, the processor 114, may write to the DMA register block 216a in the DMA block 216 the number of words to DMA transfer and the memory address to write those words to. An embodiment of the invention may comprise DMA transfer of 32-bit words.

In operation, the processor 114 may indicate via an asserted camera enable signal CamEn that the image sensor 110 may start capturing images. The image sensor 110 may enable the circuitry to capture the intensity levels of the images for various colors, for example, red, green, and blue. These color intensity levels may be converted to YUV 4:4:4 color space format, which may be an uncompressed format. This format may then be compressed to the YUV 4:2:2 color space format. Alternatively, the image sensor 110 may directly output YUV 4:2:2 color space format.

The image data in the YUV color space format may be communicated to the image processor 112 as video data CamData, which may comprise, for example, 8 bits. Each 8 bits may comprise Y, U, or V information. The image sensor 110 may also communicate a video data synchronizing clock signal CamDck that may be utilized by the Camera Interface block 210 to latch the 8 bits of video data CamData when the data are valid. The image sensor 110 may also communicate a horizontal synchronization signal CamHs and a vertical synchronization signal CamVs to the cameral interface block 210 in order to indicate end of a horizontal line and end of a frame, respectively.

The line buffer 212 may store pixel information for a present horizontal line in a line buffer 212a or 212b. When the line buffer 212a or 212b is full, the other line buffer 212b or 212a, respectively, may be used to store pixel information for the next video line. For example, the horizontal synchronization signal CamHs may indicate when to switch to the other line buffer. The line buffer that is not receiving data from the image sensor may provide data to the data selector block 214. An embodiment of the invention may comprise transferring, for example, 128 bits of data at a time from the line buffer block 212 to the data selector block 214. In this manner, the line buffer block 212 may receive image data for a present line from the image sensor 110, while providing image data for a previous line to the data selector block 214. The data provided by the data selector block 214 may be received by the DMA block 216, which may then DMA transfer the data to the memory block 116.

The DMA transfers may transfer the data corresponding to Y luminance to one logical portion of the memory block 116, the data corresponding to the U chrominance to another logical portion of the memory block 116, and the data corresponding to the V chrominance to still another logical portion of the memory block 116. Accordingly, data corresponding to each video channel, for example, Y luminance, U chrominance, or V chrominance, may be transferred to one logical portion of the memory block 116 so that data may be accessed sequentially for each channel. This is described in more detail with respect to FIG. 4b.

Figure 3A:
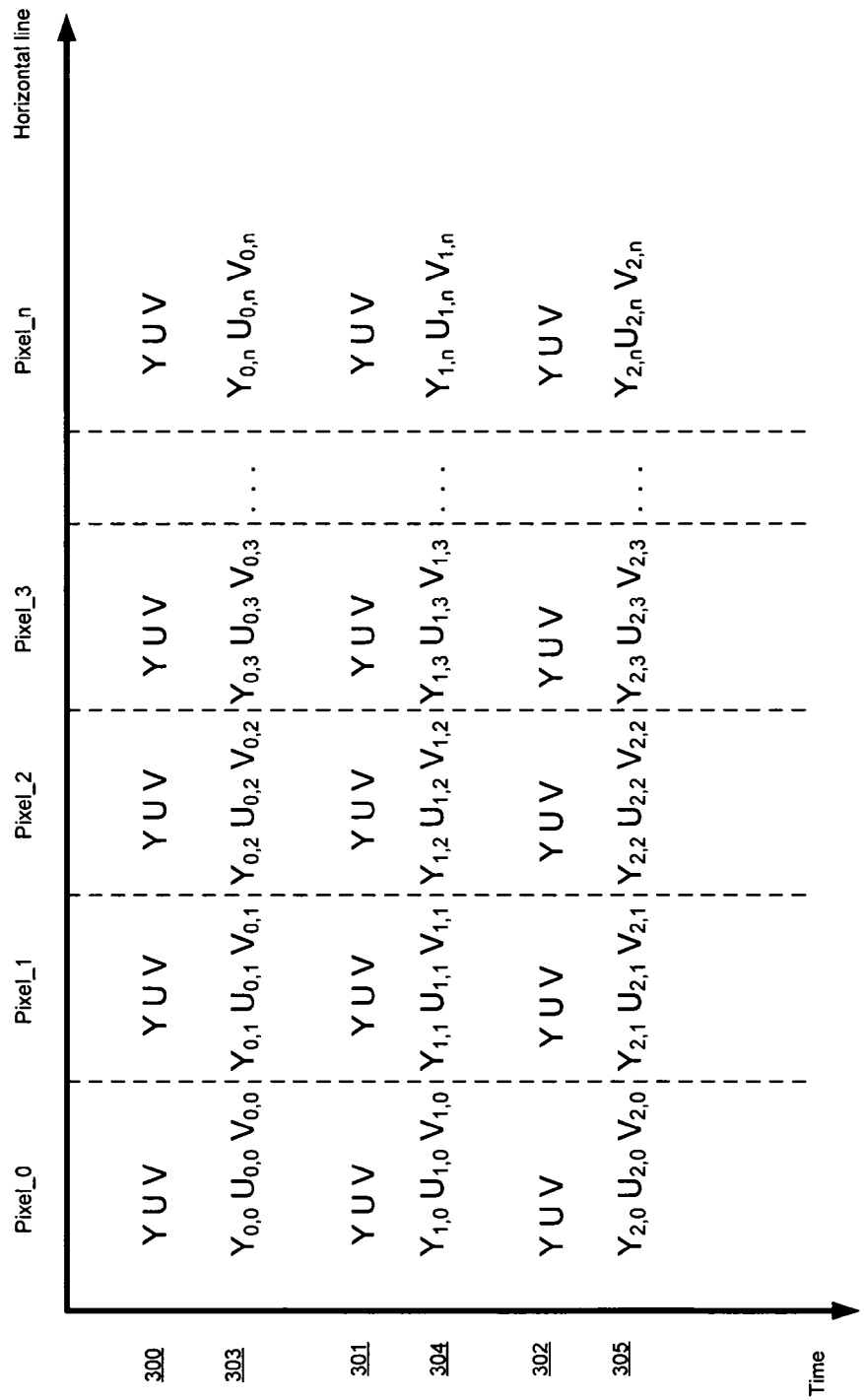
FIG. 3a is an exemplary diagram illustrating 4:4:4 subsampling, which may be utilized in connection with an embodiment of the invention.

FIG. 3a is an exemplary diagram illustrating 4:4:4 subsampling, which may be utilized in connection with an embodiment of the invention. Referring to FIG. 3a, there is shown a sequence of pixel positions for three horizontal lines 300, 301, and 302. There is also shown the horizontal lines 303, 304, and 305, where each pixel may specify information for the three channels Y, U, and V. Since the YUV 4:4:4 color space format is uncompressed, each pixel in the three horizontal lines 303, 304, and 305 may have the same information as each corresponding pixel in the horizontal lines 300, 301, and 302.

The Y, U, and V channel information in the horizontal lines 303, 304, and 305 may correspond to each pixel position for the n+1 video pixels for the three horizontal lines 300, 301, and 302. Each pixel may have, for example, 3 bytes associated with it, where one byte may correspond to the Y luminance data, another byte may correspond to U chrominance data, and the third byte may correspond to V chrominance data. Each pixel component Y, U, or V may be denoted by 2 numbers. The two numbers may indicate the line position and pixel position that the channel information is from.

Figure 3B:
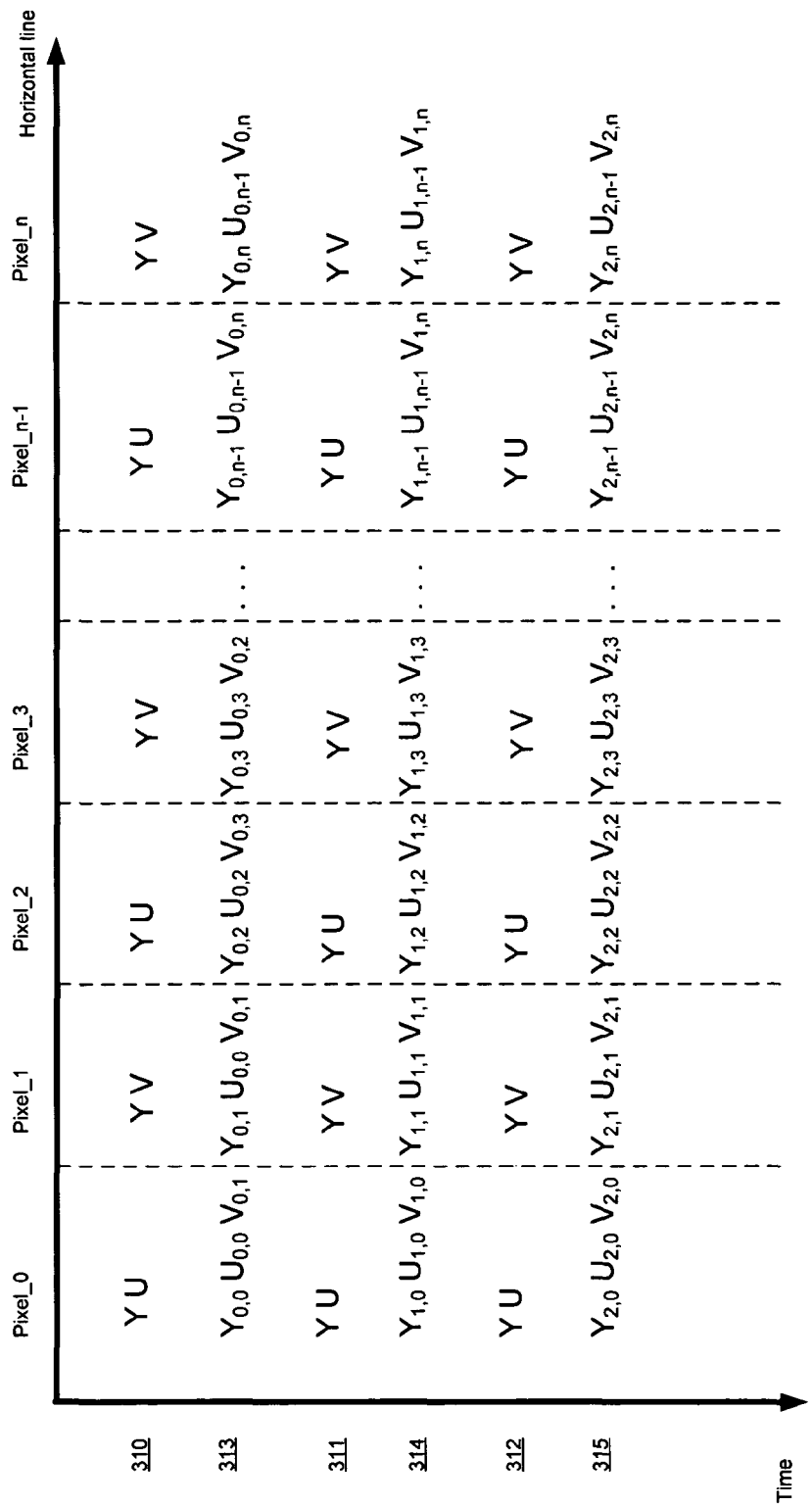
FIG. 3b is an exemplary diagram illustrating 4:2:2 subsampling, which may be utilized in connection with an embodiment of the invention.

FIG. 3b is an exemplary diagram illustrating 4:2:2 subsampling, which may be utilized in connection with an embodiment of the invention. Referring to FIG. 3b, there is shown a sequence of pixels for three horizontal lines 310, 311, and 312 where each pixel may be missing information for either the U or V channel. There is also shown the horizontal lines 313, 314, and 315, where each pixel may specify information for each of the three channels Y, U, and V, where information for the missing channel U or V may have been recreated. The YUV 4:2:2 color space format may be a compressed format, where the Y channel may not be compressed. However, the U and V channel may be compressed by sampling at ½ the sampling rate of the Y channel for every line. Accordingly, odd pixels may have U channel information while even pixels may have V channel information. Therefore, the horizontal lines 310, 311, and 312 may comprise the compressed YUV 4:2:2 color space format lines, while the horizontal lines 313, 314, and 314 may comprise horizontal lines after decompression.

The Y, U, and V channel information for each of the n+1 pixels in the horizontal lines 313, 314, and 315 may correspond to the n+1 pixels for the three horizontal lines 310, 311, and 312. Each pixel 1 the horizontal lines 313, 314, and 315 may have, for example, 3 bytes associated with it, where one byte may correspond to the Y channel, another byte may correspond to U channel, and the third byte may correspond to V channel. Each pixel channel Y, U, or V may be denoted by 2 numbers. The two numbers may indicate the line position and pixel position, respectively, that the channel information is from. Line numbers 0, 1, and 2 may correspond to the horizontal lines 310, 311, and 312, respectively.

However, since each pixel in the horizontal lines 310, 311, and 312 may have associated with it channel Y information and one of the U or V channel information, the missing information may need to be recreated. One way to recreate the missing chrominance information may be to duplicate the information from a neighboring pixel.

For example, Pixel_0 and Pizel_1 in the first horizontal line 310 may correspond to the Pixel_0 and Pixel_1 in the horizontal line 312. Pixel_0 in the horizontal line 310 may have Y channel information and U channel information, while Pixel_1 in the horizontal line 310 may have Y channel information and V channel information. In order to recreate the missing V channel information for the Pixel_0, the V channel information from the next pixel Pixel_1 may be duplicated. Similarly, to recreate the missing U channel information for the Pixel_1, the U channel information from the previous pixel Pixel_0 may be duplicated.

Accordingly, the Pixel_0 may have the 3 channels denoted as $(Y_{0,0} U_{0,0} V_{0,1})$ where $Y_{0,0}$ and $U_{0,0}$ may indicate that the information for the Y and U channels may be from the Pixel_0 in the horizontal line 310. $V_{0,1}$ may indicate that the information for the V channel may be from Pixel_1 in the horizontal line 310. Similarly, the Pixel_1 may have the 3 channels denoted as $(Y_{0,1} U_{0,01} V_{0,1})$ where $Y_{0,1}$ and $V_{0,1}$ may indicate that the information for the Y and V channels may be from the Pixel_1 in the horizontal line 310. $U_{0,0}$ may indicate that the information for the U channel may be from Pixel_0 in the horizontal line 310. In this manner, each pixel in a horizontal line may recreate information for the U channel or V channel as needed. If there is an odd number of pixels, and the last pixel needs to recreate information for the V channel, the information from the previous pixel may be copied.

Figure 3C:
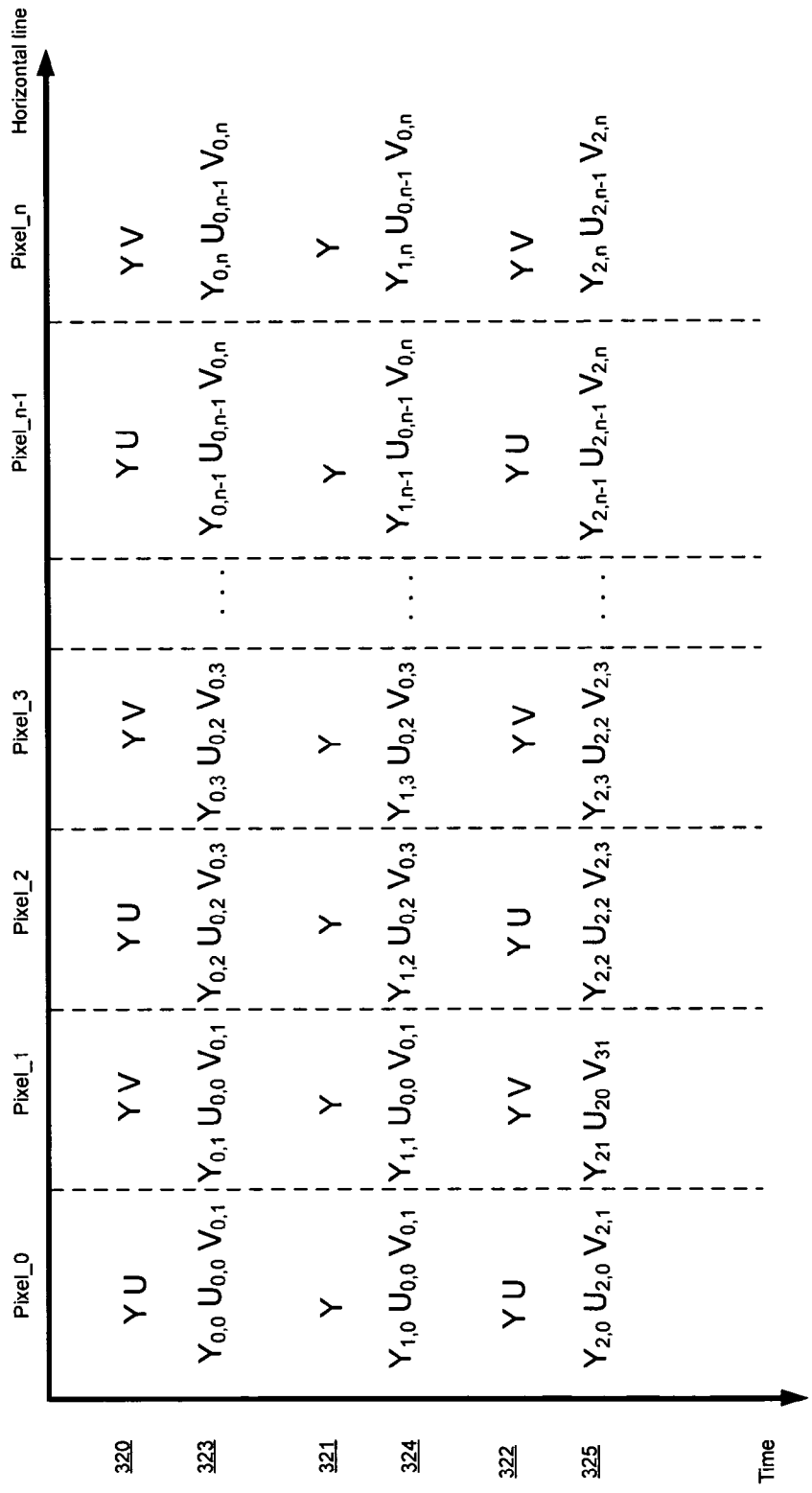
FIG. 3c is an exemplary diagram illustrating 4:2:0 subsampling, which may be utilized in connection with an embodiment of the invention.

FIG. 3c is an exemplary diagram illustrating 4:2:0 subsampling, which may be utilized in connection with an embodiment of the invention. Referring to FIG. 3c, there is shown a sequence of pixels for three horizontal lines 320, 321, and 322 where each pixel in the horizontal lines 320 and 322 may not have information for all three channels Y, U, and V. There is also shown the horizontal lines 323, 324, and 325, where each pixel may specify information for each of the three channels Y, U, and V, where information for the missing channels U and/or V may have been recreated from other pixels.

The YUV 4:2:0 color space format may be a compressed format, where information for the U and V channels may be compressed. The U and V channel may be compressed by sampling at ½ the sampling rate of the Y channel for every line. Additionally, alternating lines may not have any U and V information at all for any pixel. For example, every even pixel Pixel_0, Pixel_2, . . . , Pixel_n−1 may have U channel information while every odd pixel Pixel_1, Pixel_3, . . . , Pixel_n may have V channel information for even horizontal lines 320 and 322, while odd horizontal line 321 may have Y channel information for each pixel. The horizontal lines 320, 321, and 322 may comprise the compressed YUV 4:2:0 color space format horizontal lines, while the horizontal lines 323, 324, and 324 may comprise horizontal lines after decompression. While even and odd is used to describe certain pixels and horizontal lines, these words are only used for exemplary purposes. The invention is not limited by the use of the terms even and odd.

The Y, U, and V channel information in the horizontal lines 323, 324, and 325 may correspond to each pixel position Pixel_0, . . . , Pixel_n for the n+1 video pixels for the three horizontal lines 320, 321, and 322. Each pixel may have, for example, 3 bytes associated with it, where one byte may correspond to the Y luminance data, another byte may correspond to U chrominance data, and the third byte may correspond to V chrominance data. Each pixel channel Y, U, or V may be denoted by 2 numbers. The two numbers may indicate the line position and pixel position that the channel information is from. Line numbers 0, 1, and 2 may correspond to the horizontal lines 320, 321, and 322, respectively. Pixel numbers 0, . . . , n may correspond to the pixel positions Pixel_0, . . . , Pixel_n.

The horizontal lines where each pixel has Y channel information and either a U channel or V channel information may be decompressed similarly as for the YUV 4:2:2 color space format described with respect to FIG. 3b. For example, the horizontal lines 320 and 322 may be decompressed to form the horizontal lines 323 and 325. Horizontal lines where each pixel may have Y channel information may duplicate the other channel information from the previous line. For example, the Pixel_0 in the horizontal line 321 may Y channel information that corresponds that pixel. However, since there is no U or V channel information for Pixel_0 in the horizontal line 321, the U and V channel information may be the same as the corresponding pixel in the previous line, for example, Pixel_0 in line 323.

Accordingly, the decompressed Pixel_0 in the horizontal line 324 may be denoted as $(Y_{1,0} U_{0,0} V_{0,1})$. The Y channel information may be from the Pixel_0 of the horizontal line 321, the U channel information may be the information in Pixel_0 of the previous decompressed horizontal line 323.

FIG. 4a is an exemplary diagram illustrating a horizontal line of video with YUV 4:2:2 color space format, which may be utilized in connection with an embodiment of the invention. Referring to FIG. 4a, there is shown two horizontal portions 410 and 412 of a horizontal line 400 that may have been generated using the YUV 4:2:2 color space format. The horizontal line 400 may comprise video data that may be in the line buffer block 212. The line buffer block 212 may communicate, for example, 128 bits of the video data at a time to the data selector block 214. In this exemplary diagram, each portion of the horizontal line 400 may comprise 8 pixels, where each pixel may comprise 2 bytes of information. One byte for each pixel may comprise information for the Y channel, and the other byte for each pixel may comprise information for either the U channel or the V channel. Accordingly, the exemplary horizontal line 400 may comprise 16 pixels.

The channel information may be communicated, for example, from the image sensor 110 to the image processor 112 one byte at a time. Accordingly, the image sensor 110 may communicate first the Y channel information 410a, then the U channel information 410b, then the Y channel information 410c, then the V channel information 410d, and so on, for the remaining 256-bits of video data for the horizontal line 410. The line buffer block 212 in the image processor 112 may communicate, for example, 128 bits of the video data at a time to the data selector block 214. The number of bits communicated to the data accumulator block 214 may be design dependent. FIG. 4b is an exemplary diagram illustrating planar transformation of interleaved video data in YUV 4:2:2 color space format, in accordance with an embodiment of the invention. Referring to FIG. 4b, there is shown the Y channel information 420, U channel information 422, and V channel information 424. Each of the channel information 420, 422, and 424 may be portions of the horizontal line 400 described with respect to FIG. 4a. The horizontal line 400 may be communicated to the data selector block 214, for example, 128 bits at a time.

Accordingly, the horizontal line portion 410 may be communicated first. The data selector block 214 may select the first 4 bytes of Y channel information 420, the bytes 410a, 410c, 410e, and 410g. These 4 bytes may be used to form, for example, a 32-bit word. This word may be communicated to the DMA block 216, which may transfer the word to memory, for example, the memory block 116. The data selector block 214 may select the next 4 bytes of the Y channel information, the bytes 410i, 410k, 410m, and 410o, to form another 32-bit word. This word may also be DMA transferred to the memory block 116 to the next word location after the previous DMA transferred word location.

Similarly, the 128 bits of video data in the remaining horizontal line portion 412 may be communicated to the data selector block 214. The eight bytes of Y channel information in the horizontal line portion 412 may be used to form, for example, two 32-bit words comprising 412a, 412c, 412e, and 412g and 412i, 412k, 412m, and 412o. These four 32-bit words may be DMA transferred to the memory block 116 by the DMA block 216. Accordingly, the DMA block 216 may transfer the Y channel information to a portion of the memory block 116 so that the Y channel information may be addressed sequentially.

Since the DMA transfers for the Y channel video data may be completed, the DMA block 216 may indicate to, for example, the processor 114 via an interrupt. The processor 114 may determine that U channel video data may need to be DMA transferred next, and may configure the DMA block 216 appropriately. The U channel information 410b, 410f, 410j, 410n, 412b, 412f, 412j, and 412n may then selected and stored in a portion of the memory block 116 so that the U channel information may be addressed sequentially. The 8 bytes of the U channel information may be DMA transferred to the memory block 116 as, for example, two 32-bit words.

Since the DMA transfers for the U channel video data may be completed, the DMA block 216 may indicate to, for example, the processor 114 via an interrupt. The processor 114 may determine that V channel video data may need to be DMA transferred next, and may configure the DMA block 216 appropriately. The V channel information 410d, 410h, 410l, 410p, 412d, 412h, 412l, and 412p may also be selected and stored in a portion of the memory block 116 so that the V channel information may be addressed sequentially. The 8 bytes of the V channel information may be DMA transferred to the memory block 116 as, for example, two 32-bit words.

When the DMA block 216 indicates to the processor 114 that the DMA transfer is finishes, the processor 114 may, for example, wait for the interrupt from the line buffer block 212 that may indicate that the next line is available. The processor 114 may then set up the DMA block 216 with appropriate information for DMA transfer of the next horizontal line.

Figure 5:
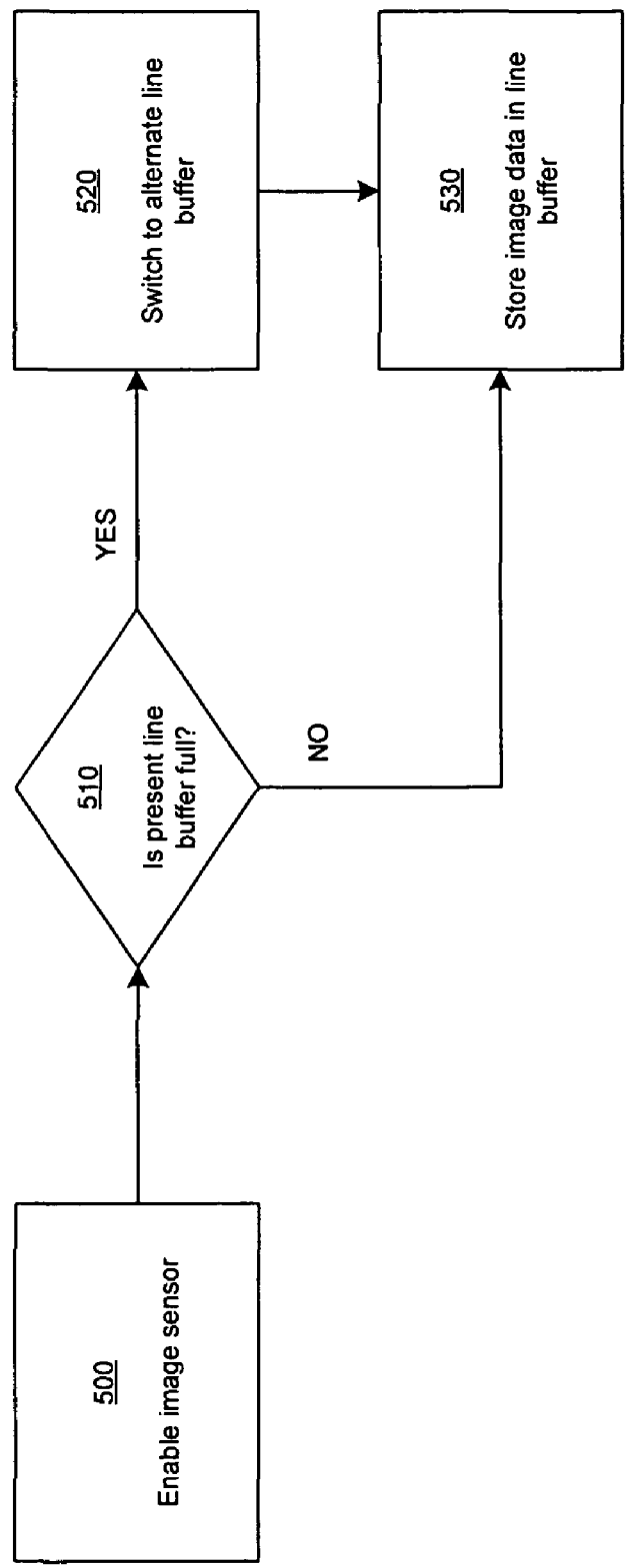
FIG. 5 is an exemplary flow diagram illustrating receiving video data in a line buffer, in accordance with an embodiment of the invention.

FIG. 5 is an exemplary flow diagram illustrating receiving video data in a line buffer, in accordance with an embodiment of the invention. Referring to FIG. 5, there is shown steps 500 to 530. In step 500, the image sensor 110 may be enabled. A processor, for example, the processor 114, may indicate via an asserted camera enable signal CamEn that the image sensor 110 may start capturing images. The image sensor 110 may then communicate image data to the line buffer block 212 via the camera interface block 210.

In step 510, the line buffer block may determine if a line buffer, for example, the line buffer 212a, that may be presently receiving the video data may be full. If so, the next step may be step 520. If not, the next step may be step 530. In step 520, the line buffer block 212 may swap line buffers, for example, from the line buffer 212a to the line buffer 212b. The line buffer 212a that was receiving data may be ready to communicate video data in the line buffer to the data selector block 214. In step 520, the other line buffer 212b may receive video data from the image sensor 110, and the video data may be stored in the line buffer.

In this manner, one line buffer may receive and store video data from the image sensor 110, and the other line buffer may communicate received video data to the data selector block 214.

Figure 6:
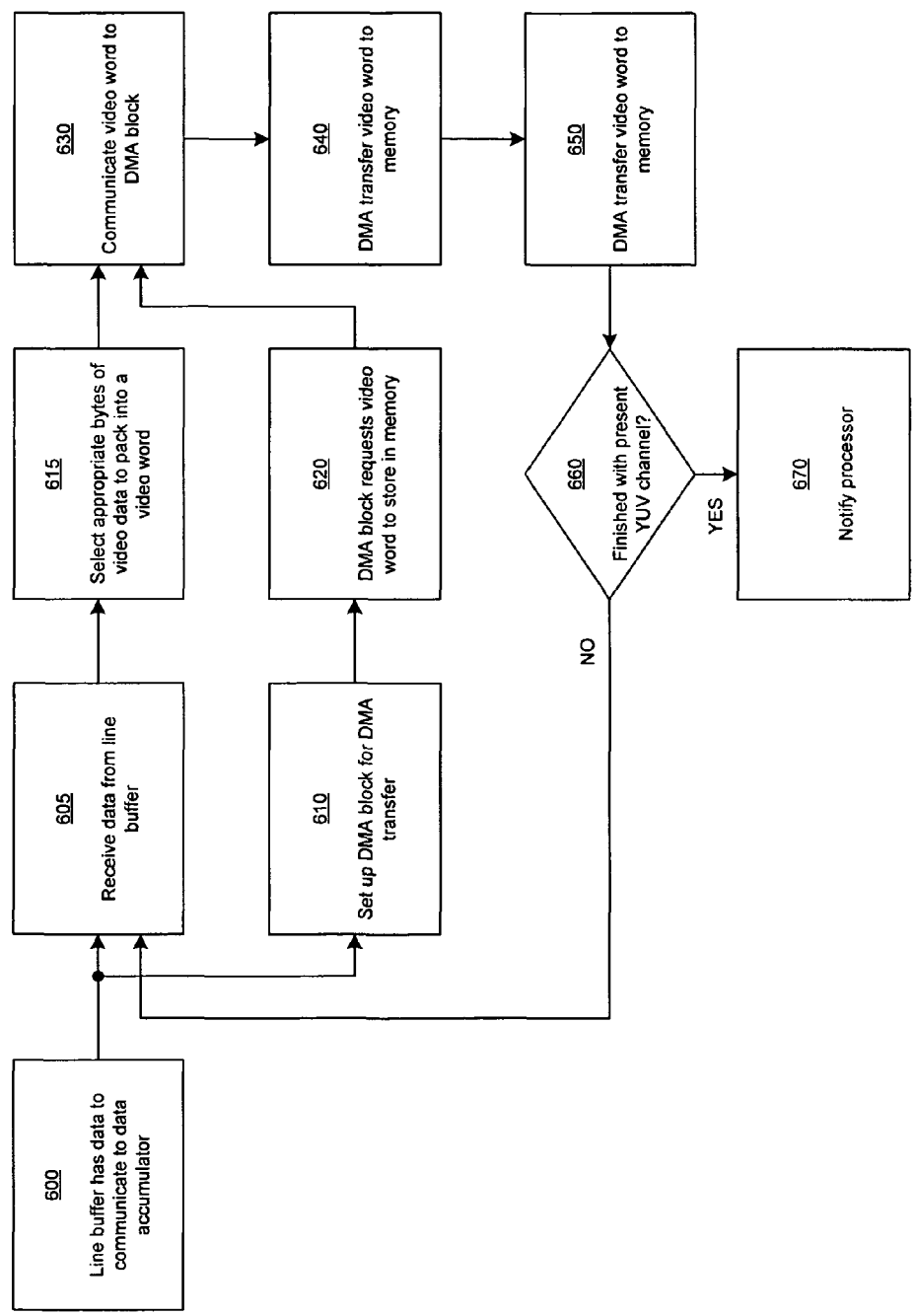
FIG. 6 is an exemplary flow diagram illustrating transforming video data in YUV 4:2:2 color space format from interleaved format to planar format, in accordance with an embodiment of the invention.

FIG. 6 is an exemplary flow diagram illustrating transforming video data in YUV 4:2:2 color space format from interleaved format to planar format, in accordance with an embodiment of the invention. Referring to FIG. 6, there is shown steps 600 to 660. In step 600, the line buffer block 212 may have video data ready to transfer to the data selector block 214. In an embodiment of the invention, the line buffer block 212 may, for example, interrupt the processor 114 when it has video data ready to transfer to the data selector block 214. This interrupt may indicate to the processor 114 to set up the DMA block 216 for DMA transfers. The DMA block 216 set up may occur in step 610.

The number of bits of data that may be transferred from the line buffer block 212 to the data selector block 214 may vary depending on implementation of the circuitry. The width of the data transferred may be, for example, multiples of 8 bits since the image sensor 110 may communicate 8 bits of video data at a time to the line buffer block 212. The video data transferred from the line buffer block 212 to the data selector block 214 may be, for example, 128 bits in width.

In step 605, the data selector block 214 may receive video data from the line buffer block 212 as, for example, 128-bit blocks. In step 615, the data selector block 214 may select specific bytes from the 128-bit video data to form, for example, 32-bit words. The selected bytes may comprise Y channel information when Y channel data is being transferred to memory, for example, the memory block 116. When U channel data is being transferred to the memory block 116, the selected bytes may comprise U channel information. Similarly, when V channel data is being transferred to the memory block 116, the selected bytes may comprise V channel information. Accordingly, in an embodiment of the invention, video data a horizontal line may need to be communicated to the data selector block 214 separately for each channel.

In step 630, the 32-bit word may be communicated to the DMA block 216. The data transfer interface between the data selector block 214 and the DMA block 216 may be via, for example, a bus. Accordingly, the DMA block 216 may request a word from the data selector block 214, and the data selector block 214 may respond with a 32-bit word. There may be appropriate handshaking between the data selector block 214 and the DMA block 216 to ensure that the DMA block 216 correctly receives the data. For example, a simple bus handshake may be a signal from the DMA block 216 to request data, and a signal from the data selector block 214 to indicate that valid data is on the bus.

In step 640, the DMA block 216 may DMA transfer the 32-bit word from the data selector block 214 to a specified location in, for example, the memory block 116. In this manner, data for the Y channel may be sequentially accessed in an area of the memory block 116. Similarly, data for the U channel may be accessed sequentially in a different portion of the memory block 116, and data for the V channel may be accessed sequentially in another portion of the memory block 116.

In step 650, circuitry in, for example, the DMA block 216 may determine if the correct number of words may have been transferred to the memory block 116. If the correct number of words have been transferred, the next step may be step 660. Otherwise, the next step may be step 605 to receive more data from the line buffer 212.

In step 660, the DMA block 216 may indicate to, for example, the processor 114, that the DMA operation is completed. The indication may be, for example, via an interrupt to the processor 114. The processor 114 may then determine whether further DMA transfers need to be accomplished for the horizontal line that was just involved in the completed DMA transfer. For example, if the DMA block just finished transferring video data for the Y channel, then two more DMA transfer operations may need to be executed for the video data in the U channel and the video data in the V channel. Accordingly, the processor 114 may set up the DMA block 216 for further transfers by writing appropriate data to the DMA register block 216a.

Some of the registers in the DMA register block 216a may be, for example, the word count register and the destination address register. The word count register in the DMA register block 216a may hold a value that may indicate the number of words to DMA transfer. When the indicated number of words have been transferred, the DMA block 216 may, for example, assert an interrupt to the processor 114 to indicate that the DMA transfers are completed. The processor 114 may initiate a DMA transfer operation by writing to the DMA register block 216a. The destination address register in the DMA register block 216a may indicate the address of the, for example, portion of the memory block 116 to which the DMA transfers may be made. The destination address register may be incremented with each DMA transfer.

From the step 600, the interrupt to the processor 114 may also lead to execution of functionality in step 610. In step 610, the processor 114 may write to the DMA register block 216a in the DMA block 216. The data may comprise the number of words to transfer and the start address of a portion of the memory block 116 to which to transfer the video data. In step 620, the DMA block 216, which may be enabled to perform DMA transfers, may request a word to transfer from the data selector block 214. The next step may be step 630.

While an embodiment of the invention may select data for each of the Y, U, and V channels in three separate passes of a horizontal line, the invention need not be so limited. Other embodiments of the invention may select data for the Y, U, and V channels from one pass of a horizontal line. That is, the data in a horizontal line may be communicated once to the data selector block 214. For example, circuitry and/or logic in the data selector block 214 may select the appropriate bytes for the video data for Y, U, and V channels, and communicate the 32-bit words of channel video data to the DMA block 216. Circuitry in the DMA block 216 may load addresses for the different Y, U, and V channel video data at appropriate times. Other embodiments of the invention may have common circuitry, for example, a state machine that may control selecting appropriate data and communicating appropriate addresses to the DMA block 216.

Figure 7A:
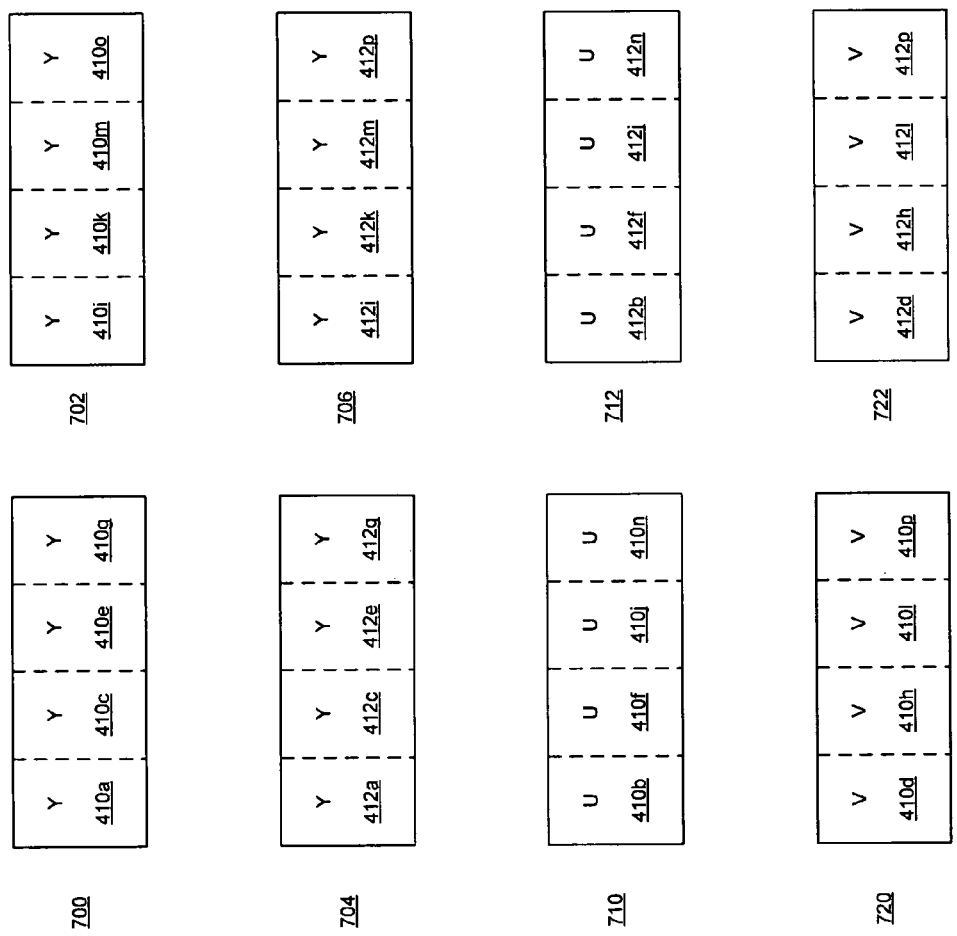
FIG. 7a is an exemplary diagram illustrating planar formatting of video information in a horizontal line of YUV 4:2:0 color space format converted from interleaved video data in YUV 4:2:2 color space format, in accordance with an embodiment of the invention.

FIG. 7a is an exemplary diagram illustrating planar formatting of video information in a horizontal line of YUV 4:2:0 color space format converted from interleaved video data in YUV 4:2:2 color space format, in accordance with an embodiment of the invention. Referring to FIG. 7a, there is shown Y channel video data words 700, 702, 704, and 706, the U channel video data words 710 and 712, and V channel video data words 720 and 722. The video data words 700, 702, 704, 706, 710, 712, 720, and 722 may be extracted from a horizontal line similar to the horizontal line 400 shown with respect to FIG. 4a.

YUV 4:2:0 color space format may comprise alternating horizontal lines that may have different amounts of video data. For example, even horizontal lines may comprise Y, U, and V channel information, while odd horizontal lines may comprise Y channel information. This illustration is for the horizontal lines with Y, U, and V channel information.

Since the YUV 4:2:0 color space format has the same Y channel information as the YUV 4:2:2 color space format, Y channel information need to be preserved. Accordingly, the first 4 bytes of Y channel information in the 128 bits of horizontal line portion 410 may be gathered as, for example, a 32-bit word 700, and the second 4 bytes of Y channel information in the 128 bits of horizontal line portion 410 may be gathered as, for example, a 32-bit word 702. Similarly, eight bytes of Y channel information in the 128 bits of the horizontal line portion 412 may be gathered as, for example, 32-bit words 704 and 706. These four 32-bit words may be stored in the memory block 116 by the DMA block 216. Accordingly, the DMA block 216 may store the Y channel information sequentially in a portion of the memory block 116.

When the line buffer block 212 communicates the horizontal line 400 again in two 128-bit blocks, the data selector block 214 may select the U channel information. The pixels of the YUV 4:2:2 color space format may alternate in having U or V channel information. Therefore, the U channel bytes 410b, 410f, 410j, 410n, 412b, 412f, 412j, and 412n of the horizontal line 400 may be selected. Accordingly, the eight bytes of U channel information from the horizontal line 400 may be gathered as two 32-bit words 710 and 712 for DMA transfer to the memory block 116.

When the horizontal line 400 is communicated yet again in two 128-bit blocks, the data selector block 214 may select the V channel information. The pixels of the YUV 4:2:2 color space format may alternate in having U or V channel information. Therefore, the V channel bytes 410b, 410f, 410j, 410n, 412b, 412f, 412j, and 412n of the horizontal line 400 may be selected. Accordingly, the eight bytes of U channel information from the horizontal line 400 may be gathered as two 32-bit words 720 and 722 for DMA transfer to the memory block 116.

Figure 7B:
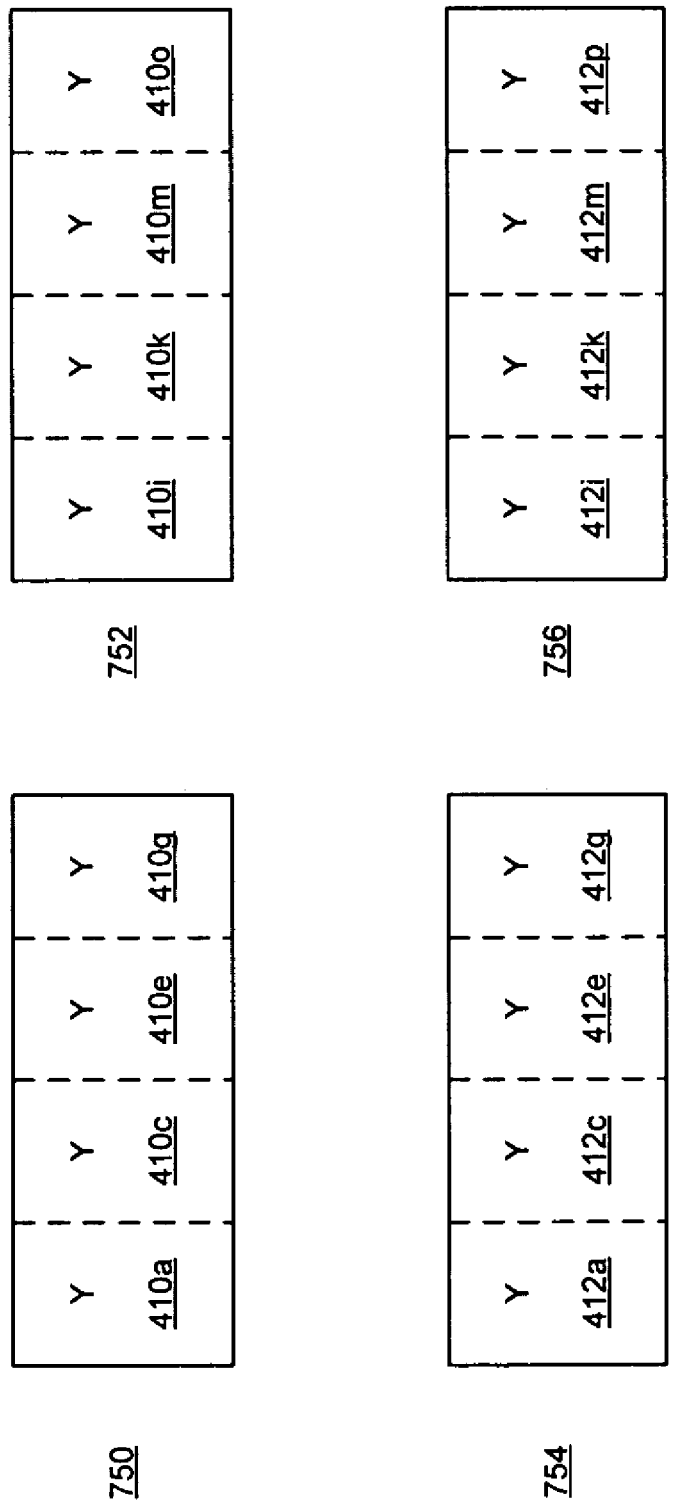
FIG. 7b is an exemplary diagram illustrating planar formatting of video information in a horizontal line of YUV 4:2:0 color space format converted from interleaved video data in YUV 4:2:2 color space format, in accordance with an embodiment of the invention.

FIG. 7b is an exemplary diagram illustrating planar formatting of video information in a horizontal line of YUV 4:2:0 color space format converted from interleaved video data in YUV 4:2:2 color space format, in accordance with an embodiment of the invention. Referring to FIG. 7b, there is shown Y channel video data words 750, 752, 754, and 756. The video data words 750, 752, 754, and 756 may be extracted from a horizontal line similar to the horizontal line 400 shown with respect to FIG. 4a.

YUV 4:2:0 color space format may comprise alternating horizontal lines that may have different amounts of video data. For example, even horizontal lines may comprise Y, U, and V channel information, while odd horizontal lines may comprise Y channel information. This illustration is for the horizontal lines comprising Y channel information.

For the alternate horizontal lines in the YUV 4:2:0 that does not have U and V channel information, extracting the Y channel information may be the same as the process described with respect to FIG. 7a. However, the data selector block 214 may need to communicate the data in the horizontal line 400 once, since the data for the channels U and V need not be extracted. The four 32-bit words 750, 752, 754, and 756 may be DMA transferred to the portion of memory that may be contiguously addressed with the words 700, 702, 704, and 706 for the previous horizontal line in YUV 4:2:0 color space format.

The U.S. application Ser. No. 11/353,900 provides a detailed description of the YUV 4:2:2 color space format to YUV 4:2:0 color space format conversion, and is hereby incorporated herein by reference in its entirety.

In accordance with an embodiment of the invention, aspects of an exemplary system may comprise a data selector circuitry, for example, the data selector block 214, that enables extraction of similar color space components from a received block of interleaved YUV color space format video data as the video data is received. The received block of interleaved YUV color space video data may comprise 128 bits. Direct memory access circuitry, for example, the DMA block 216, may enable transfer of the extracted similar color space components to a memory, for example, the memory block 116, where each type of the similar color space components may be stored contiguously in separate portions of the memory block 116 in planar format. The data selector block 214 may receive the block of interleaved YUV format video data from a line buffer, for example, the line buffer block 212. The line buffer block 212 may comprise two line buffers 212a and 212b.

The interleaved video data in YUV 4:2:2 color space format for a present horizontal line may be received by one of the two line buffers, for example, the line buffer 212a, while the other line buffer 212b may communicate the interleaved video data in YUV 4:2:2 color space format for a previous horizontal line for data extraction by the selector block 214. Each of the two line buffers 212a and 212b may receive the interleaved video data in YUV 4:2:2 color space format in byte format.

A direct memory access circuitry, for example, the DMA block 216, may be initiated for direct memory access operation when the line buffer 212a or 212b that is receiving the interleaved video data is full. The DMA block 216 may also be initiated for direct memory access operation when the similar component for a complete horizontal line is extracted. The similar component may be, for example, a similar Y component, a similar U component, or a similar V component of the YUV color space video data.

The data for a similar Y component, a similar U component, and a similar V component of the YUV color space video data may be stored in, for example, the memory block 116 as 32-bit words by, for example, the DMA block 216. The similar Y component, the similar U component, and the similar V component of the YUV color space video data may comprise 8 bits of information per pixel.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing video signals, the method comprising:
    extracting similar color space components from a received block of interleaved YUV color space format video data as said video data is received; and
    transferring said extracted similar color space components to a memory, wherein each type of said similar color space components is stored contiguously in separate portions of said memory in planar format, wherein a chroma subsampling of said received video data is maintained during said planar storage of said extracted similar color space components of said received video data.

2. The method according to claim 1, further comprising receiving said block of interleaved YUV format video data from a line buffer.

3. The method according to claim 2, wherein said line buffer is one of two line buffers.

4. The method according to claim 3, further comprising receiving interleaved video data in YUV 4:2:2 color space format for a present horizontal line by a first of said two line buffers, while communicating said interleaved video data in YUV 4:2:2 color space format for a previous horizontal line by a second of said two line buffer for said extraction.

5. The method according to claim 3, wherein each of said two line buffers receive said interleaved video data in YUV 4:2:2 color space format in byte format.

6. The method according to claim 3, further comprising initiating a direct memory access operation when said line buffer receiving said interleaved video data is full.

7. The method according to claim 1, wherein said transferring is done via direct memory access.

8. The method according to claim 1, further comprising initiating a direct memory access operation for said transferring when said similar color space component for a complete horizontal line is extracted.

9. The method according to claim 8, wherein said initiation is done for each of a similar Y component and a similar U component of said YUV color space video data.

10. The method according to claim 8, wherein said initiation is done for each of a similar Y component, a similar U component, and a similar V component of said YUV color space video data.

11. The method according to claim 1, further comprising storing said data for a similar Y component, a similar U component, and a similar V component of said YUV color space video data as 32-bit words.

12. The method according to claim 1, wherein each of a similar Y component, a similar U component, and a similar V component of said YUV color space video data comprises 8 bits of information per pixel.

13. The method according to claim 1, wherein said received block of interleaved YUV color space video data comprises 128 bits.

14. A system for processing video signals, the system comprising:
   a data selector circuitry that enables extraction of similar color space components from a received block of interleaved YUV color space format video data as said video data is received; and
   a direct memory access circuitry that enables transfer of said extracted similar color space components to a memory, wherein each type of said similar color space components is stored contiguously in separate portions of said memory in planar format, wherein a chroma subsampling of said received video data is maintained during said planar storage of said extracted similar color space components of said received video data.

15. The system according to claim 14, wherein said data selector circuitry receives said block of interleaved YUV format video data from a line buffer.

16. The system according to claim 15, wherein said line buffer is one of two line buffers.

17. The system according to claim 16, wherein interleaved video data in YUV 4:2:2 color space format for a present horizontal line is received by a first of said two line buffers, while communicating said interleaved video data in YUV 4:2:2 color space format for a previous horizontal line by a second of said two line buffer for said extraction.

18. The system according to claim 16, wherein each of said two line buffers receive said interleaved video data in YUV 4:2:2 color space format in byte format.

19. The system according to claim 16, further comprising a direct memory access circuitry that is initiated for direct memory access operation when said line buffer receiving said interleaved video data is full.

20. The system according to claim 14, wherein said direct memory access circuitry executes said direct memory access.

21. The system according to claim 14, further comprising a direct memory access circuitry that is initiated for direct memory access operation when said similar color space component for a complete horizontal line is extracted.

22. The system according to claim 21, wherein said initiation is done for each of a similar Y component and a similar U component of said YUV color space video data.

23. The system according to claim 21, wherein said initiation is done for each of a similar Y component, a similar U component, and a similar V component of said YUV color space video data.

24. The system according to claim 14, wherein said data for a similar Y component, a similar U component, and a similar V component of said YUV color space video data are stored as 32-bit words.

25. The system according to claim 14, wherein each of a similar Y component, a similar U component, and a similar V component of said YUV color space video data comprises 8 bits of information per pixel.

26. The system according to claim 14, wherein said received block of interleaved YUV color space video data comprises 128 bits.

* * * * *

UNITED STATES PATENT AND TRADEMARK OFFICE
CERTIFICATE OF CORRECTION

| | | |
|---|---|---|
| PATENT NO. | : 8,130,317 B2 | |
| APPLICATION NO. | : 11/353686 | |
| DATED | : March 6, 2012 | |
| INVENTOR(S) | : Weidong Li | |

It is certified that error appears in the above-identified patent and that said Letters Patent is hereby corrected as shown below:

Column 14
Line 61, Claim 4, please replace "line buffer" with --line buffers--.

Column 16
Line 8, Claim 17, please replace "line buffer" with --line buffers--.

Signed and Sealed this
Eighteenth Day of December, 2012

David J. Kappos
*Director of the United States Patent and Trademark Office*